(12) United States Patent
Ganassi et al.

(10) Patent No.: US 7,305,870 B2
(45) Date of Patent: Dec. 11, 2007

(54) APPARATUS FOR TESTING A MOVING VEHICLE

(75) Inventors: Chip Ganassi, Pittsburgh, PA (US); Benjamin Bowlby, Zionsville, IN (US)

(73) Assignee: Chip Ganassi Racing Teams, Inc., Pittsburgh, PA (US)

( * ) Notice: Subject to any disclaimer, the term of this patent is extended or adjusted under 35 U.S.C. 154(b) by 0 days.

(21) Appl. No.: 11/515,968

(22) Filed: Sep. 5, 2006

(65) Prior Publication Data

US 2007/0000315 A1  Jan. 4, 2007

Related U.S. Application Data

(62) Division of application No. 10/939,077, filed on Sep. 10, 2004, now Pat. No. 7,131,319.

(51) Int. Cl.
    G01M 9/00 (2006.01)
    G01M 9/02 (2006.01)
(52) U.S. Cl. .................................. 73/116; 73/147
(58) Field of Classification Search ................. 73/116, 73/147
    See application file for complete search history.

(56) References Cited

U.S. PATENT DOCUMENTS 3,964,306 A * 6/1976 Fletcher et al. .......... 73/861.74
4,073,188 A    2/1978 Slezinger et al.
4,750,355 A * 6/1988 Urabe et al. .................. 73/147
4,751,844 A    6/1988 Matsushita
5,025,659 A    6/1991 Starr, Jr. et al.
5,173,856 A   12/1992 Purnell et al.
5,495,754 A    3/1996 Starr, Jr. et al.
5,686,651 A   11/1997 Hur et al.
5,693,872 A * 12/1997 Quinn ....................... 73/23.31
6,615,652 B1 * 9/2003 Bechstein et al. ............ 73/147
6,637,168 B2  10/2003 Satomi et al.

FOREIGN PATENT DOCUMENTS

DE       4036197    2/1992
JP       04-070534  3/1992
JP       04-070535  3/1992

OTHER PUBLICATIONS

Pi Sigma Elite Systems detailing its 2003 logging and control systems for motorsports; three pages; © 2003-2004.
IIHS-HLDI Vehicle Research Center detailing crash research; two pages; http://www.iihs.org/vehicle_ratings/vrc.htm; Aug. 24, 2004; © 1996-2004.
Information from The Honda Crash Testing Center; three pages; http://www.driveandstayalive.com/info%20section/crash%20testing/crash-testing-centers_...; Aug. 24, 2004.

(Continued)

Primary Examiner—Edward Lefkowitz
Assistant Examiner—Jermaine Jenkins
(74) Attorney, Agent, or Firm—Bose McKinney & Evans LLP

(57) ABSTRACT

An apparatus and method is provided for testing at least one performance characteristic of a vehicle.

22 Claims, 10 Drawing Sheets

OTHER PUBLICATIONS

"Just Coasting," by Paul Van Valkenburgh in the V-Angles section of the Jan. 2004 edition of Racecar Engineering; vol. 14, No. 1; two pages.

"V-Angles" by Paul Van Valkenburgh in a 1995 edition of Racecar Engineering; vol. 5, No. 3; four pages.

"Swift Is Sure" by Carroll Smith in a 1995 edition of Racecar Engineering; vol. 5, No. 3; five pages.

Information and specification on the Air Quest 1200 Dehumidifier from Jon-Don; two pages; © 2004.

* cited by examiner

APPARATUS FOR TESTING A MOVING VEHICLE

CROSS-REFERENCE TO RELATED APPLICATIONS

This application is a divisional of U.S. patent application Ser. No. 10/939,077, filed Sep. 10, 2004, now U.S. Pat. No. 7,131,319 the disclosure of which is expressly incorporated by reference herein.

FIELD OF THE INVENTION

The present invention relates to an apparatus and method for testing at least one performance characteristic of a vehicle and in particular to testing at least one performance characteristic of the vehicle as the vehicle is moving.

BACKGROUND

Being able to optimize the performance characteristics of a vehicle is important for many reasons. An example performance characteristic is the amount of aerodynamic drag a vehicle experiences as it travels. Aerodynamic drag is defined as the resistance a vehicle experiences when passing through air. This resisting force is exerted on the vehicle parallel to the vehicle's trajectory or direction and opposite in direction to the vehicle's motion.

Additional performance characteristics including lift and mechanical resistance, such as wheel bearing resistance, also can affect the performance of a vehicle, such as a racecar. Lift is defined as the aerodynamic force which acts normal to the direction of the body in motion.

By minimizing the amount of drag a vehicle experiences as it moves through air, the fuel economy of the vehicle may be increased and the vehicle is able to travel at a higher speed for a given motive force (power). The minimization of drag is particularly important in the world of competitive automobile racing. A single pound of drag can result in about a 0.1 mile per hour (mph) difference in the average lap racing speed of a contemporary racecar. Ideally, a racecar should be setup to minimize drag and to maximize negative lift or downforce as it is often referred to.

Traditionally, testing to reduce drag, increase downforce, and/or evaluate additional performance characteristics, such as aerodynamic performance characteristics, has typically been accomplished in two ways, straight line testing and wind tunnel testing. As used herein, testing is defined as the gathering of data which may be used to evaluate a performance characteristic of a vehicle, such as aerodynamic drag or downforce. In conventional straight line testing the vehicle is moved relative to a support surface. In conventional wind tunnel testing air is moved over a stationary object, such as a vehicle, and forces on the object produced by the air movement are measured. In both cases the relative air speed must be high enough to produce measurable forces on the object.

In order to provide enough space, straight line testing is done in an open environment. One of the problems with testing in an open environment is that there is little chance of repeatability of environment conditions from a first test to a second test. One of the biggest and most important variables is the presence or absence of wind either in line with the movement of the vehicle or at an angle to the movement of the vehicle. Other variables include temperature and humidity. By not having a repeatable testing environment it is difficult to determine if changes in monitored performance characteristics, such as aerodynamic drag and down force, determined by data gathered during testing are due to changes in the design or setup of the vehicle, are due to changes in the environmental conditions, or are due to a combination of the two.

Wind tunnel testing provides the ability to control certain environmental parameters, but has several drawbacks. First, often a model of the vehicle must be made because the physical size of the wind tunnel cannot accommodate the full size vehicle. Second, the vehicle remains stationary during testing and air is forced past the vehicle. The performance characteristics of a stationary vehicle are not equivalent to the performance characteristics of a moving vehicle. The differences can be attributable at least to the fact that the car is not moving relative to the support or floor (especially important for race cars which have low clearances relative to the support), the air effects due to tire rotation are not present (especially important for open wheel vehicles), and the exhaust and other attributes of a running vehicle are not present though all of these elements can be modeled, but with increasing complexity and room for error.

As such, a need exists for a testing apparatus and method which provides a testing environmental which has the capability to provide generally repeatable environmental conditions, in particular wind conditions, and which permits a vehicle to be tested as the vehicle is functioning in its normal mode of operation.

In one exemplary embodiment, a method for testing a vehicle moving under its own power and having one or more sensors coupled thereto to evaluate at least one performance characteristic of the vehicle is provided. The method comprising the steps of providing a support having an upper surface, the support configured to support the vehicle and to permit the vehicle to travel across the upper surface; providing a generally repeatable static volume of air above the support; accelerating the vehicle under its own power along the support to a desired speed; detecting when the vehicle enters a test region of the support; detecting when the vehicle exits the test region of the support; monitoring one or more of the sensors coupled to the vehicle at least while the vehicle is in the test region of the support; and decelerating the vehicle to a stop. In one example, the step of providing the generally repeatable static volume of air above the support includes the step of providing an upper portion which cooperates with the support to define an enclosure which encloses a volume of air which is not generally influenced by air currents outside of the upper portion.

In another exemplary embodiment, an apparatus for testing a vehicle moving under its own power to evaluate at least one performance characteristic of the vehicle, the vehicle having a controller is provided. The apparatus comprising a support configured to support the vehicle and to permit the vehicle to travel over an upper surface of the support; an upper portion, the upper portion and the support cooperating to define an enclosure, the upper portion having an entrance, the entrance being positionable in an open position permitting the vehicle to ingress into and egress out of the enclosure and a closed position generally blocking the vehicle from ingress into and egress out of the enclosure; a first transmitter coupled to one of the support and the upper portion and located at a first position along a length of the support, the first transmitter configured provide an indication to the controller of the vehicle that the vehicle has passed the first position, the first position being chosen to provide a sufficient length of the support to permit the acceleration of the vehicle to a predetermined speed prior to reaching the first position; and a second transmitter coupled to one of the support and the upper portion and located at a second position along the length of the support spaced apart from the first position, the second transmitter configured provide an indication to the vehicle that the controller of the vehicle has passed the second position, the second position being chosen to provide a sufficient length of support subsequent to the second position to permit the vehicle to decelerate to a stop. In one example, the first transmitter and the second transmitter each emit a signal that is received by a receiver on the vehicle as the vehicle passes by the respective transmitter.

In a further exemplary embodiment, an apparatus for testing a vehicle moving under its own power to evaluate at least one performance characteristic of the vehicle is provided. The apparatus comprising a support configured to support the vehicle and to permit the vehicle to travel over an upper surface of the support; and an upper portion, the upper portion and the support cooperating to define an enclosure, the upper portion having an entrance, the entrance being positionable in an open position permitting the vehicle to ingress into and egress out of the enclosure and a closed position generally blocking the vehicle from ingress into and egress out of the enclosure; the upper portion further including a break away section removably coupled to the upper section and configured to become spaced apart from the remainder of the upper portion when the vehicle impacts the breakaway section, the breakaway section thereby permitting the vehicle to at least partially egress from the enclosure. In one example, the entrance includes a door and the breakaway section is a first portion of the door. In another example, the apparatus further comprises a second support positioned outside of the enclosure and adjacent the breakaway section, the second support configured to support the vehicle as it egresses from the enclosure through the breakaway section. In one variation the apparatus further comprises an impact member supported by the second support and configured to aid in the deceleration of the vehicle.

In still a further exemplary embodiment, an apparatus for testing a moving vehicle to evaluate at least one performance characteristic of the vehicle, the vehicle having a first component is provided. The apparatus comprising an enclosure having a first entrance and a support configured to permit the movement of the vehicle relative to an upper surface of the support, the first entrance configured to permit ingress and egress of the vehicle relative to the enclosure; a sensor adapted to be coupled to the vehicle and configured to monitor the first component of the vehicle and to provide sensor data corresponding to the first component of the vehicle; a first indicator located at a first position within the enclosure and a second indicator located at a second position within the enclosure, the second position being spaced apart from the first position and the portion of the support located generally between the first position and the second position defining a test region of the apparatus, the first indicator being configured to provide a first indication corresponding to the vehicle being at the first position and the second indicator being configured to provide a second indication corresponding to the vehicle being at the second location; and a controller operably coupled to the sensor and configured to collect information related to the sensor data at least when the vehicle is in the test region, the test region being of a length sufficient to permit the collection of information related to sensor data for a predetermined period of time. In one example, the predetermined period of time is at least about 5 seconds to about 7 seconds.

In yet a further exemplary embodiment, a method of testing a vehicle to evaluate at least one performance characteristic of a moving vehicle, the vehicle having an associated sensor. The method comprising the steps of providing an environment with generally repeatable environmental characteristics, the environment including an enclosure having a support surface; positioning the vehicle generally proximate to a first end of the support surface; accelerating the vehicle relative to the support surface to a first speed, the first speed being at least about 100 mph; capturing sensor date corresponding to the performance of the vehicle; and decelerating the vehicle to a rest position. In one example, the step of providing the environment comprises the steps of enclosing an existing tunnel to define an enclosed body of generally static air; paving a support surface on a bottom portion of the tunnel; and providing an entrance for ingress into and egress out of at least one end of the tunnel. In another example, the method further comprises the steps of monitoring an environmental condition selected from the group of temperature and humidity; and controlling a device to adjust the environmental condition.

In still yet a further embodiment, an apparatus for testing a vehicle moving under its own power to evaluate at least one performance characteristic of the vehicle is provided. The apparatus comprising a support configured to support the vehicle and to permit the vehicle to travel over an upper surface of the support, the support being of a sufficient length to permit the vehicle to accelerate, move at a desired speed and decelerate in its normal mode of operation; and an upper portion, the upper portion and the support cooperating to define an enclosure, the upper portion having an entrance configured to permit ingress into and egress from the enclosure; at least one turntable coupled to the support and configured to support the vehicle and to change the orientation of the vehicle, the at least one turntable being positioned at a first end of the support.

In an additional embodiment, an apparatus for testing a vehicle moving under its own power to evaluate at least one performance characteristic of the vehicle, the vehicle including at least one sensor is provided. The apparatus comprising an enclosure having a controllable environment; the enclosure including a first section for vehicle acceleration to a predetermined speed, a second section for gathering information from the sensor for evaluating at least one performance characteristic of the vehicle at the predetermined speed for a predetermined time, and a third section for vehicle deceleration to a stop; and a controller for controlling at least one environmental condition of the enclosure to provide for subsequent testing of the vehicle at generally repeatable environmental conditions. In one example, wherein the environmental condition is selected from the group of temperature and humidity. In another example, the apparatus further comprises a sensor within the enclosure to monitor the environmental condition and to provide an indication of the environmental condition to the controller. In yet a further example, the apparatus further comprises an alarm to monitor the environmental condition of the enclosure. In one variation, the alarm is a carbon monoxide alarm.

Additional features of the invention will become apparent to those skilled in the art upon consideration of the following detailed description of the preferred embodiment exemplifying the best mode of carrying out the invention as presently perceived.

DETAILED DESCRIPTION OF EXEMPLARY EMBODIMENTS

Figure 1A:
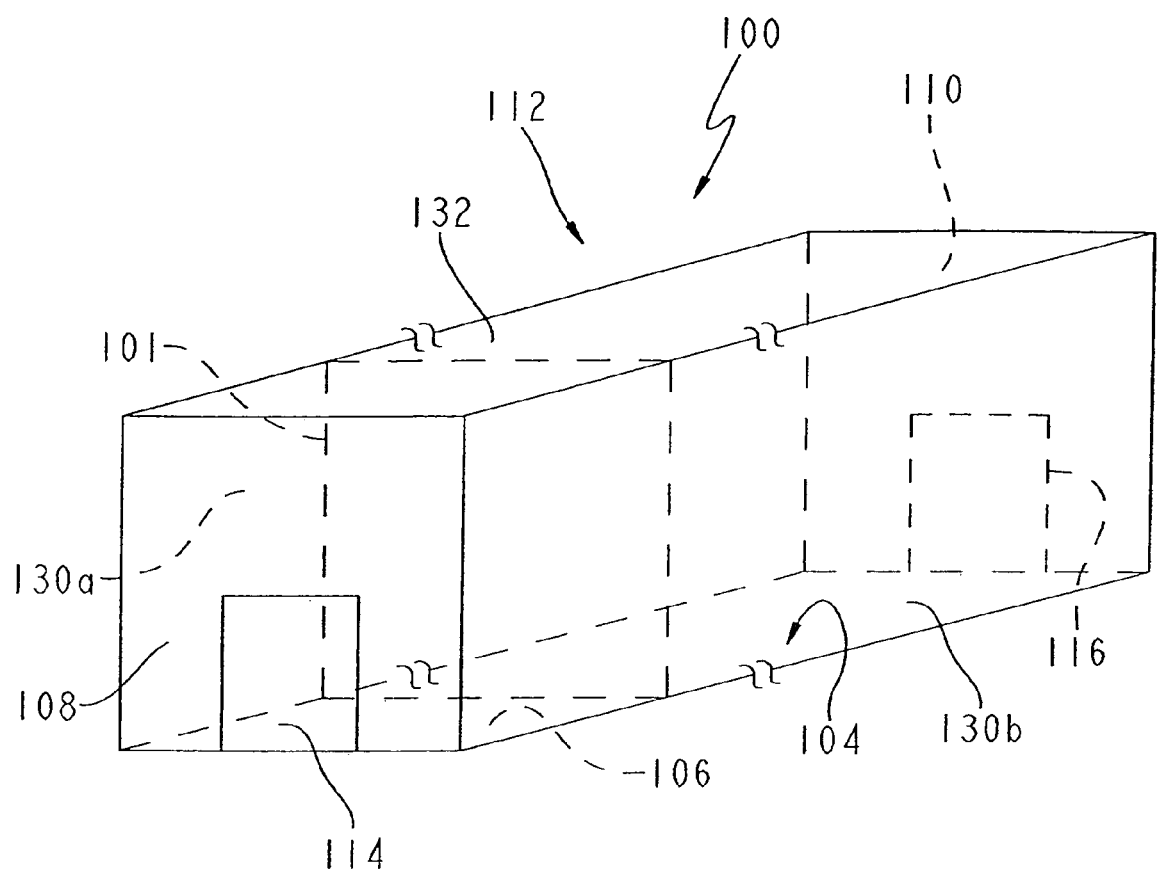
FIG. 1A is a perspective view of an exemplary enclosure having a support for supporting a vehicle, a top portion, a first end, and a second end.

Referring to FIG. 1, an apparatus 100 for testing a vehicle 150 (see FIG. 4) to evaluate at least one performance characteristic of vehicle 150 is shown. Apparatus 100 includes an enclosure 102 having a support 104 which supports vehicle 150 and permits vehicle 150 to move across an upper surface 106 of support 104. Enclosure 102 includes a top portion 112 which includes a first end wall 108 and a second end wall 110. Top portion 112 cooperates with support 104 to define an enclosed volume of air. In one embodiment, the enclosed volume of air is a generally stable body of air providing repeatable minimal or non-existent wind or air flow conditions.

In one example, the enclosed volume of air is sealed from the outside environment. In another example, the enclosed volume of air is in fluid communication with the outside environment such that air may flow into and/or out of the enclosure through one or more openings, such as apertures, cracks, and/or leaks. However, the enclosed volume of air of enclosure 100 should still provide repeatable minimal or non-existent wind or air flow conditions at least in the region of enclosure 100 wherein data is to be gathered from vehicle 150, such as section 162.

In one embodiment, enclosure 100 may be completely open on one end and still provide repeatable minimal or non-existent wind or air flow conditions at least in the region of enclosure 100 wherein data is to be gathered from vehicle 150, such as section 162. In one example, an end, such as the end containing entrance 114, may be in fluid communication with the outside environment (the door of entrance 114 may be opened or non-existent) while the other portions of enclosure 100 are sealed or generally sealed from the outside environment resulting in only minimal or non-existent air flow or wind conditions in the region of enclosure 100 which corresponds to the region of enclosure 100 wherein data is to be gathered from vehicle 150, such as section 162.

Figure 1B:
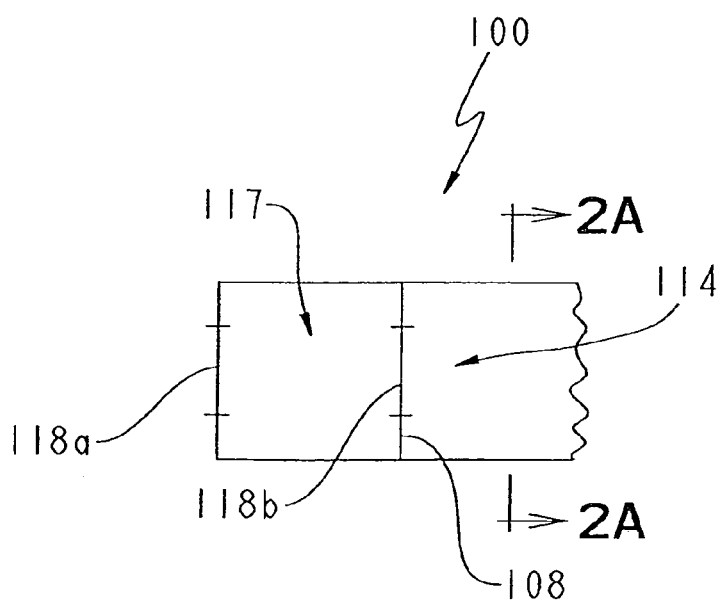
FIG. 1B is a partial top view of the enclosure of FIG. 1A having a second enclosure positioned outside of the first end, the second enclosure being located between two doors.

As illustratively shown in FIG. 1A, first end wall 108 includes an entrance 114 which permits ingress into and egress from enclosure 102. In one embodiment, entrance 114 is a single door, such as a garage door or a roll-top door, and is sized to permit the ingress and egress of vehicle 150 relative to enclosure 102. In one example (see FIG. 1B), entrance 114 includes multiple spaced apart doors defining an enclosure 117 therebetween. In order to ingress vehicle 150 into enclosure 102, an outer door 118a is opened and vehicle 150 is moved to the space 117 between outer door 118a and an inner door 118b. Outer door 118a is subsequently closed and inner door 118b is opened thereby permitting the ingress of the vehicle into enclosure 102. One advantage of having spaced apart multiple doors is that vehicle 150 can be ingress into or egress out of enclosure 102 while minimizing the exposure of enclosure 102 to the ever changing environmental conditions of the outside world.

In one embodiment, second end wall 110 also includes an entrance 116, entrance 116 being generally similar to entrance 114. In an alternative embodiment, an entrance, such as entrance 114, is provided in top portion 112 at a location between first end 108 and second end 110. In another alternative embodiment, an entrance such as an elevator or lift is provided in support 104. In one example, entrances 114 and 116 are water-tight. In another example, entrances 114 and 116 are air-tight.

Figure 2A:
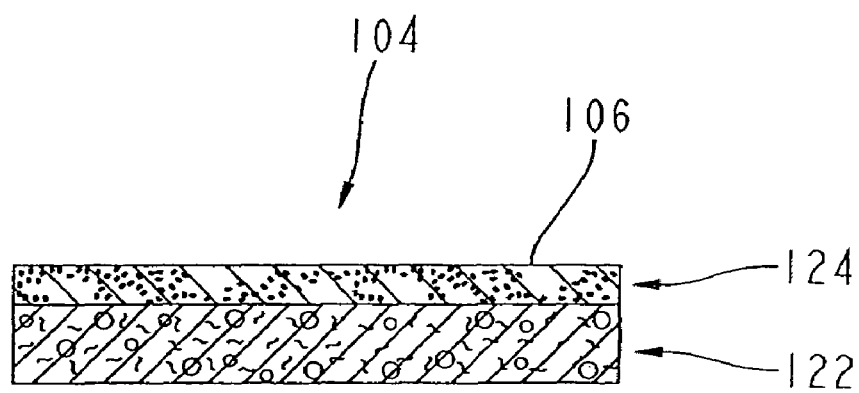
FIG. 2A is a sectional view of the support of FIG. 1B.

Referring to FIG. 2A, support 104 and in particular upper surface 106 of support 104 is generally flat along a transverse length of upper surface 106. In alternative embodiments, support 104 is generally convex along a transverse length of upper surface 106. In another embodiment, support 104 and in particular upper surface 106 is banked along a transverse length to simulate the banking of some race tracks.

Figure 2B:
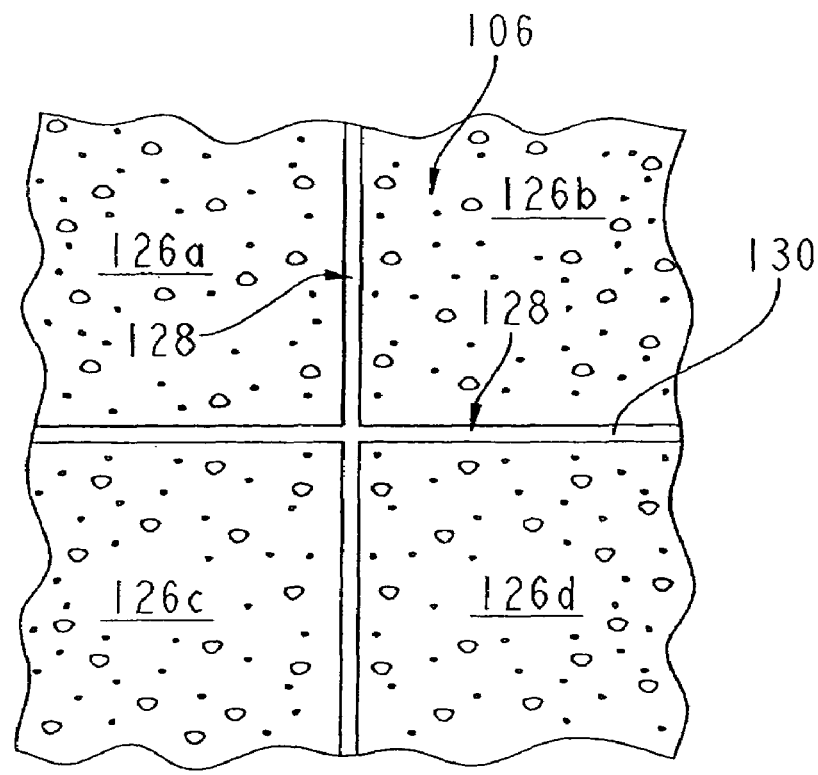
FIG. 2B is a top view of an exemplary support for use with the enclosure of FIG. 1A.

Support 104 illustratively includes a concrete lower portion 122, similar to standard concrete interstate road sections and an asphalt upper portion 124 including upper surface 106. In alternative embodiments, support 104 may be fabricated from other suitable materials. In one embodiment, both of concrete lower portion 122 and asphalt upper portion 124 are cut into sections, such as sections 126a, 126b, 126c, 126d in FIG. 2B, to provide expansion joints 128 and a sealing compound 130 is filled into the gap between respective sections. In one example, sections 126 are about 30 feet long by about 11 ft wide.

In one embodiment, support 104 and in particular upper surface 106 of support 104 is generally flat along a longitudinal extent of upper surface 106. In another embodiment, at least a portion of upper surface 106 has one of an uphill grade or a downhill grade. In yet a further embodiment, support 140 and in particular upper surface 106 is curved. In still a further embodiment, support 140 and in particular upper surface 106 includes one or more straight sections and one or more curved or otherwise non-linear sections. In one example, support 104 and in particular upper surface 106 defines a closed loop, such as an oval. In yet another embodiment, support 104 and in particular upper surface 106 includes one or more bumps or depressions to simulate a bump and/or depression in a race track surface.

Upper surface 106 of support 104 should be as smooth as possible to permit the faster acceleration of vehicle 150 across support 104 and to minimize any effects of the surface variation on the performance of vehicle 150. In one example, upper surface 106 is about a forty in road numbers meaning that upper surface 106 contains approximately 40 inches of up and down variation over a mile of asphalt. In another example, the upper surface can be ground to about a five road number.

Returning to FIG. 1A, top portion 112 is shown as a generally quadrilateral section having two walls 130a and 130b and a ceiling 132. In alternative embodiment, top portion 112 has a generally rounded shape, a triangular shape, or other suitable shape.

In one embodiment, a cross-sectional area 101 (see FIG. 1) of enclosure 100, transverse to the direction of travel of vehicle 150 during testing, should be sized such that vehicle 150 occupies no more than about 10 percent of cross-sectional area 101. In other examples, vehicle 150 should occupy no more than about 5 percent of cross-sectional area 101.

Figure 3:
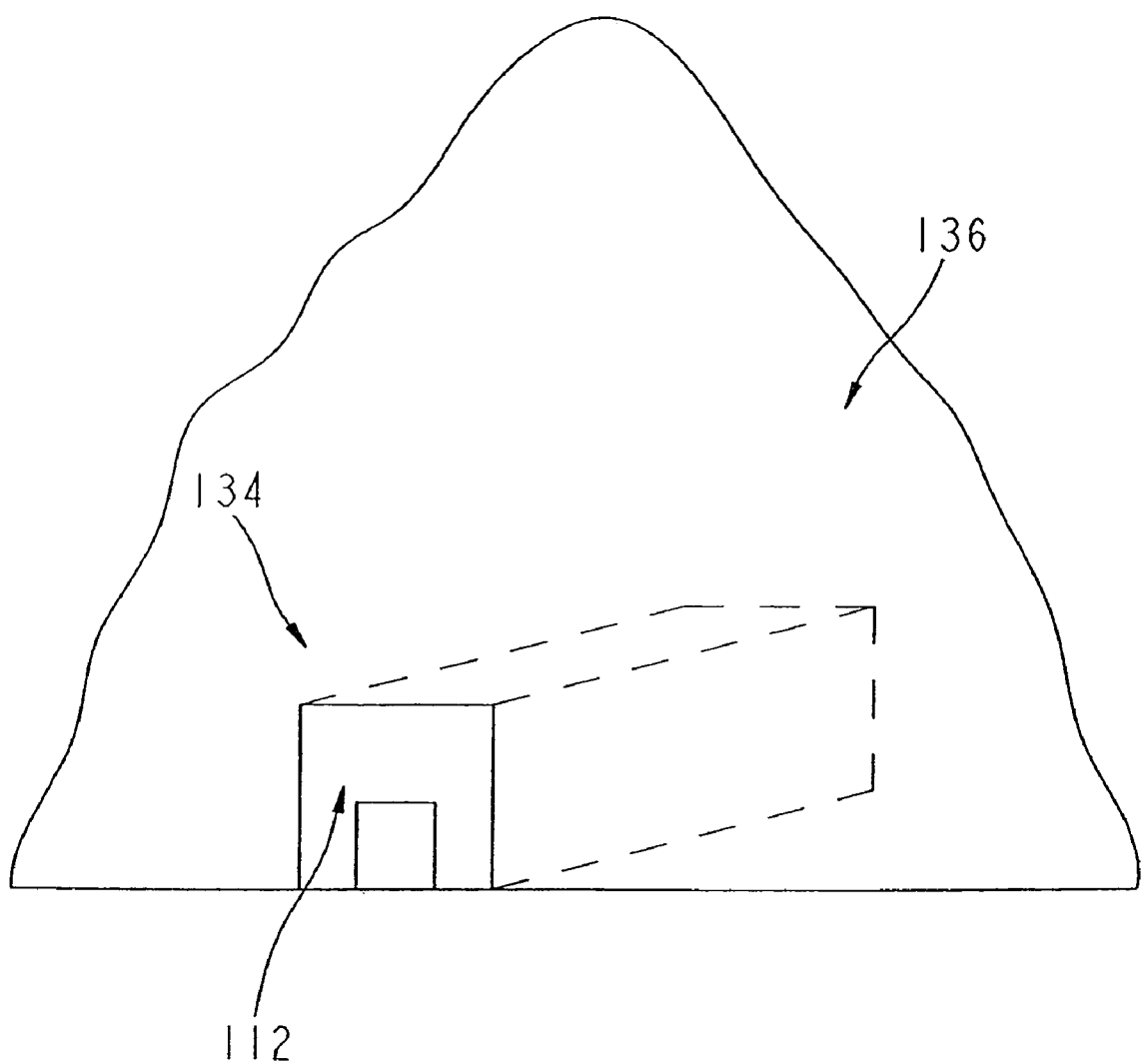
FIG. 3 is an illustrative view of the enclosure of FIG. 1A being at least partially formed from a tunnel in a mountain.

In one embodiment, top portion 112 is a free standing structure, such as a building, and may be fabricated from a variety of building materials, such as wood, concrete, metal, plastic, or combination thereof. In a preferred embodiment shown in FIG. 3, top portion 112 is formed as part of a tunnel 134 dug into a mountain 136. As is well known in the art of tunnels, the upper surface and side surfaces of the tunnel may have various structures coupled thereto, such as walls and a ceiling made from concrete or other building materials. One advantage of using a tunnel to assist in defining the enclosure, the tunnel generally has a constant temperature without the need for heating and/or cooling units which create additional air currents in the enclosure. In an alternative embodiment, an underground mine or quarry may be used.

In one embodiment, an existing tunnel previously used for public vehicle transportation or railway transportation is converted to an enclosure 100. The existing tunnel is capped at both ends with an entrance being provided in one of the ends or in both of the ends. The entrance is movable between an open position to permit the ingress and egress of vehicle 150 and a closed position to provide a static volume of air not influenced by outside air currents. A support is provided for the vehicle to travel across while inside the enclosure. In one example, an asphalt support is paved over an existing roadbed to provide an upper surface suitable for testing. Additional components described herein may be added to the existing tunnel as well, such as transmitters 188, alarms 200, and environmental control units 204.

As explained herein, enclosure 100 permits vehicle 150 (see FIG. 4) to be tested in a repeatable environment under normal operating conditions, such as vehicle 150 moving across upper surface 106 of support 104 under its own power. Therefore, enclosure 100 requires a portion of support 104 to be used to permit the acceleration of vehicle 150 to a desired speed, a portion of support 104 to be used for gathering information related to the performance of vehicle 150 for a predetermined time, and a portion of support 104 to be used to permit the deceleration of vehicle 150. The length of section 162 and the speed of vehicle 150 influence the predetermined time information is gathered. Either increasing the length of section 162 and/or decreasing the speed of vehicle 150 increases the predetermined time. In one example, the predetermined time is in the range of about 5 seconds to about 7 seconds. In another example, section 162 is lengthened such that the predetermined time is about 10 seconds or about 20 seconds.

Figure 4:
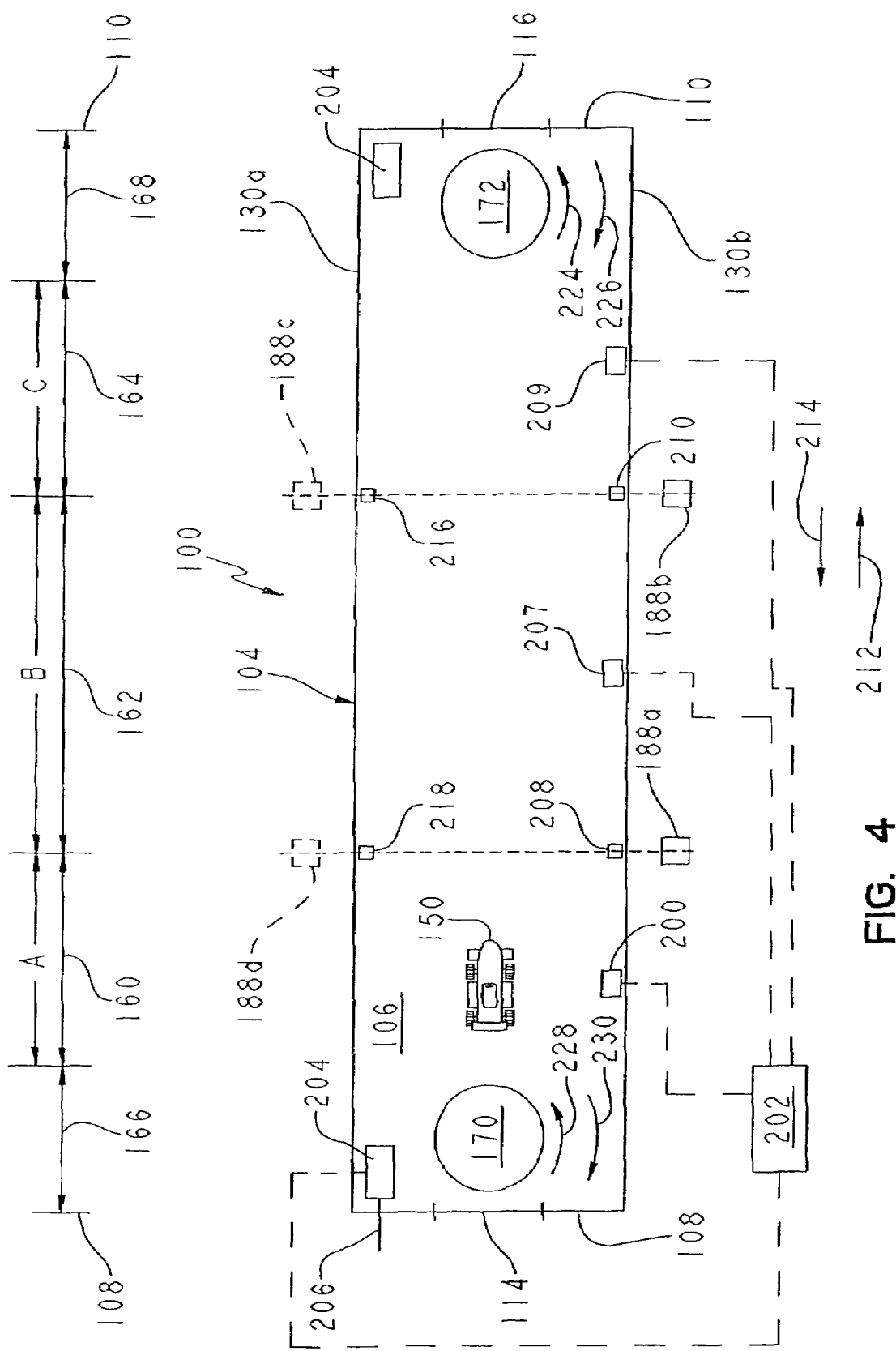
FIG. 4 is a diagrammatic top view of the enclosure of FIG. 1A.

Referring to FIG. 4, a diagrammatic overhead view of enclosure 100 is shown. Support 104 is shown divided generally into three sections 160, 162, and 164. Sections 160, 162, 164 may be approximately equal length along a longitudinal direction of support 104. However, sections 160, 162, 164 may have different lengths relative to each other. For instance, section 162 may be longer than sections 160 and 164. Support 104 further includes additional sections 166 and 168 which may be used for the storage of equipment, as areas designated for personnel during testing, or for additional uses. Sections 166 and 168 each illustratively include turntables 170 and 172 which are used to assist in the orientation of vehicle 150 relative to support 104.

Section 160 is generally positioned proximate to first end 108 of enclosure 100. A length A of section 160 generally is chosen to at least permit the acceleration of vehicle 150 to a desired speed for testing. In one example, length A is chosen to permit the acceleration of vehicle 150 to about 100 mph. In another example, length A is chosen to permit the acceleration of vehicle 150 to about 120 mph to 130 mph. The length A is a function of the desired speed and the acceleration capabilities of vehicle 150. In one exemplary embodiment, vehicle 150 is a race car, such as for the NASCAR® series or the INDY CAR® series, and length A is at least about 1500 feet to permit the acceleration of vehicle 150 to a speed of about 100 mph to about 130 mph. In an alternative embodiment, length A is chosen such that vehicle 150 is permitted to accelerate to a speed of about 50 mph.

In alternative embodiments, length A of section 160 can be shortened by the inclusion of a catapult system (not shown) to aid in the acceleration of vehicle 150. The catapult system is used to accelerate vehicle 150 which is then further propelled and/or accelerated by its own power source or engine.

Section 164 is generally positioned proximate to second end 110 of enclosure 100. A length C of section 164 generally is chosen to at least permit the deceleration of vehicle 150 to a stop. In one example, length C is chosen to permit the deceleration of vehicle 150 from about 100 mph to a stop with or without the aid of a braking system of vehicle 150. In another example, length C is chosen to permit the deceleration of vehicle 150 from about 120 mph to about 130 mph to a stop with or without the aid of a braking system of vehicle 150. The length C is a function of the speed of vehicle 150 as it exits section 162 and the deceleration capabilities of vehicle 150. In one exemplary embodiment, vehicle 150 is a race car, such as for the NASCAR® series or the INDY CAR® series, and length C is at least about 1500 feet to permit the deceleration of vehicle 150 from about 100 mph to about 130 mph to a stop. In one example, wherein vehicle 150 is tested as it travels through section 162 in direction 212 and again in direction 214, sections 160 and 164 are generally equal length.

In alternative embodiments, length C of section 164 can be shortened by the inclusion of a tailhook (not shown) on vehicle 150 and arresting wires (not shown) in section 164 configured to couple with the tailhook to aid in the deceleration of vehicle 150. The combination tailhook and arresting wires are used to decelerate vehicle 150 which is then further decelerated by the braking system of vehicle 150.

Section 162 is generally positioned between sections 160 and 164. A length B of section 162 generally is chosen to at least permit the capture of useful data from one or more sensors 180 (see FIG. 5) coupled to vehicle 150 for a predetermined time. The length of section 162 and the speed of vehicle 150 influence the predetermined time information is gathered. Either increasing the length of section 162 and/or decreasing the speed of vehicle 150 increases the predetermined time. In one example, the predetermined time is in the range of about 5 seconds to about 7 seconds. In another example, section 162 is lengthened such that the predetermined time is about 10 seconds or about 20 seconds. In one example, length B is at least about 1500 feet. As such, in one exemplary embodiment the length of sections 160, 162, 164 combined is at least about 4500 feet. In another exemplary embodiment, the combined length of sections 160, 162, 164 is at least 4000 feet.

Figure 5:
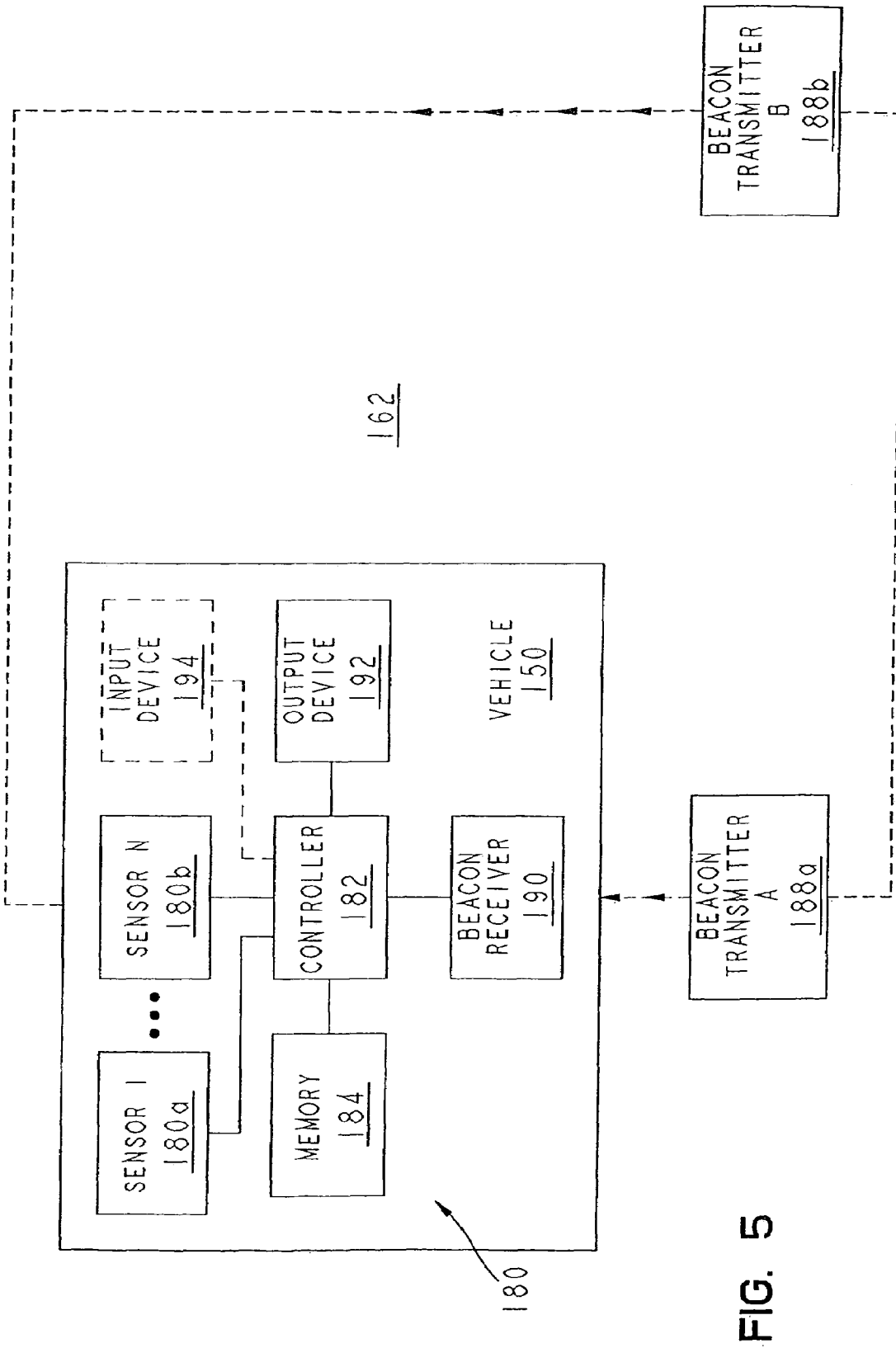
FIG. 5 is a diagrammatic view of the interaction between the vehicle and two transmitters which define a beginning and an end of a test section of the enclosure.

Referring to FIG. 5, vehicle 150 includes one or more sensors 180, such as sensors 180a and 180b which are operably connected to a controller 182. Controller 182 receives sensing signals from sensors 180 over a wired connection, a wireless connection, or a combination of a wired connection and a wireless connection or controller 182 monitors a parameter of sensors 180, such as a voltage. In one example, the sensing signals are sent or the parameters are monitored at a rate of about 500 Hz. In another example, the sensing signals are sent or the parameters are monitored at a rate of about 1000 Hz.

Controller 182 stores the data received from sensors 180 in the sensing signals or the monitored parameters in an associated memory 184 as either analog information, digital information, or a combination of analog information and digital information. In an alternative embodiment, the data received from sensors 180 or the monitored parameters are automatically provided to a remote device instead of being stored in memory 184. Exemplary sensors include, pressure sensors, temperature sensors, speed sensors, and the sensors listed in U.S. Pat. No. 5,173,856 assigned to Pi Research Limited, the disclosure of which is expressly incorporated by reference herein.

Preferably controller 182 associates a time or other counter with the sensor data stored in memory 184 so that a rate of change in the sensor data can be determined. Further, in one embodiment, sensor data is only stored for the timeframe that vehicle 150 is in section 162 of support 104. In another embodiment, sensor data is stored for timeframes wherein vehicle 150 is outside of section 162 and inside section 162 and an indication is provided in the sensor data indicating when vehicle 150 enters and exits section 162.

As shown if FIGS. 4 and 5, enclosure 100 includes two transmitters 188a and 188b which emit a signal generally transverse to the direction of travel of vehicle 150 on support 104. The emitted signals are received by a receiver 190 on vehicle 150 as the receiver passes in front of the respective transmitter. Controller 182 utilizes the detection of the emitted signal from transmitters 188a and 188b to indicate when vehicle 150 enters section 162 and when vehicle 150 exits section 162, respectively. As such, controller 182 is programmed to store sensor data in memory 184 subsequent to the detection of a first transmitted signal from transmitter 188a until the detection of a second transmitted signal from transmitter 188b or to provide an indication in the stored data as to when vehicle 150 enters section 162 and exits section 162.

In one example, controller 182 is configured to differentiate between the signals transmitted from transmitter 188a and transmitter 188b. In another example, controller is configured to simply use a first detected signal regardless of whether transmitted by transmitter 188a or transmitter 188b as a start signal and a second detected signal regardless of whether transmitted by transmitter 188a or transmitter 188b as a stop signal.

Controller 182 further is operably coupled to an output device 192, such as a screen, a portable memory, a network connection, a wireless network device, such as a cell phone or a transceiver, a serial connection, or a printer. Output device 192 permits the data to be provided to a computer or other device for further processing. Controller 182 in one embodiment is further operably coupled to an input device 194, such as a keypad, touch screen, keyboard, network connection, wireless network device, a portable memory, or a serial connection to permit information to be provided to controller 182 such as software updates.

In one embodiment, controller 182, transmitters 188a, 188b, receiver 190, memory 184, output device 192, input device 194, and/or at least some of sensors 180 are components of the Sigma Elite System available from Pi Research located at 8250 Haverstick, Suite #275, Indianapolis, Ind. 46240. Additional details regarding exemplary controllers 182, transmitters 188a, 188b, receiver 190, memory 184, output device 192, input device 194, and/or at least some of sensors 180 is found in U.S. Pat. No. 5,173,856 assigned to Pi Research Limited, the disclosure of which is expressly incorporated by reference herein.

Enclosure 100 further includes at least one safety alarm 200. Safety alarm 200 includes a sensor to monitor at least one environmental condition of the enclosure to provide an alarm indication if the at least one environmental condition is not acceptable. In one embodiment, safety alarm 200 provides a visual indication of an alarm condition, an audible indication of an alarm condition, a tactile indication of an alarm condition, and/or a combination thereof. In one example, alarm 200 provides an indication of an alarm status to a remote device, such as controller 202 over one of a wired connection and a wireless connection. Controller 202 may then actuate other devices based on the alarm status, such as opening entrances 114 and 116, powering on various air handling units, turning on sprinkler systems, and/or initiating a communication to safety personnel, such as a fire department.

An exemplary safety alarm is a carbon monoxide detector and alarm which is configured to detect levels of carbon monoxide in the enclosure. As vehicles are being tested, the engines of the vehicles produce exhaust that contains carbon monoxide. An exemplary carbon monoxide detector is the Nighthawk Premium Plus Carbon Monoxide Alarm available from Kidde located on the Internet at www.kidde.com. Other exemplary alarms may include smoke detectors, and additional gas sensors such as formaldehyde detectors.

Enclosure 100 further includes one or more air handling units 204 which alter the conditions of the air within enclosure 100. A preferred air handling unit is a dehumidifier 204 which is used to remove moisture from the air in the enclosure. The dehumidifier removes moisture from the air in enclosure 100 and deposits the removed moisture outside of enclosure 100 through a conduit or hose 206. An exemplary dehumidifier is the Air Quest 1000 made by AQS. Other exemplary air handling units include heaters, fans, exhaust fans, air purifiers, air filters. In one example, air is introduced into the enclosure such that the enclosure is maintained at a higher pressure than the outside environment. Air handling units 204 are shown positioned in sections 160 and 164, but may be positioned at multiple locations in the enclosure.

In one embodiment, enclosure 100 includes one or more sensors 207 to sense one or more environmental conditions of enclosure 100, such as temperature, humidity, and/or pressure. In one example, sensors 207 are incorporated into a portable weather station, such as the Vantage pro system available from Davis Instrument Corp. located at 3465 Diablo Ave. Hayward, Calif. 94545, USA. The measurements taken by sensor 207 are provided to controller 202 over one of a wireless connection or a wired connection.

Sensor 207 is shown positioned in section 162, but may be positioned at multiple locations in the enclosure.

In one embodiment, controller 202 controls the operation of one or more of the environmental devices, such as a dehumidifier to alter the environmental condition of enclosure 100. As such, controller 202 is able to maintain a constant temperature, a constant humidity, and/or other environmental condition within enclosure 100.

Enclosure 100 further includes visual indicators to communicate to a driver of vehicle 150 of the beginning of section 162 and of the ending of section 162. In one example, the visual indicators are a green light 208 at the beginning of section 162 and a red light 210 at the end of section 162. Green light 208 and red light 210 are visible by the driver from direction 214 as vehicle 150 travels in direction 212. A second green light 216 and a second red light 218 are visible by the driver from direction 212 as vehicle 150 travels in direction 214.

In one embodiment, enclosure 100 further includes at least one video camera 209 to record the testing of vehicle 150. Video camera 209 is shown positioned in section 164, but may be positioned at multiple locations in the enclosure. Video camera 209 may record the testing of vehicle 150 on film, store images on an associated memory, and/or send video images to controller 202.

Figure 9:
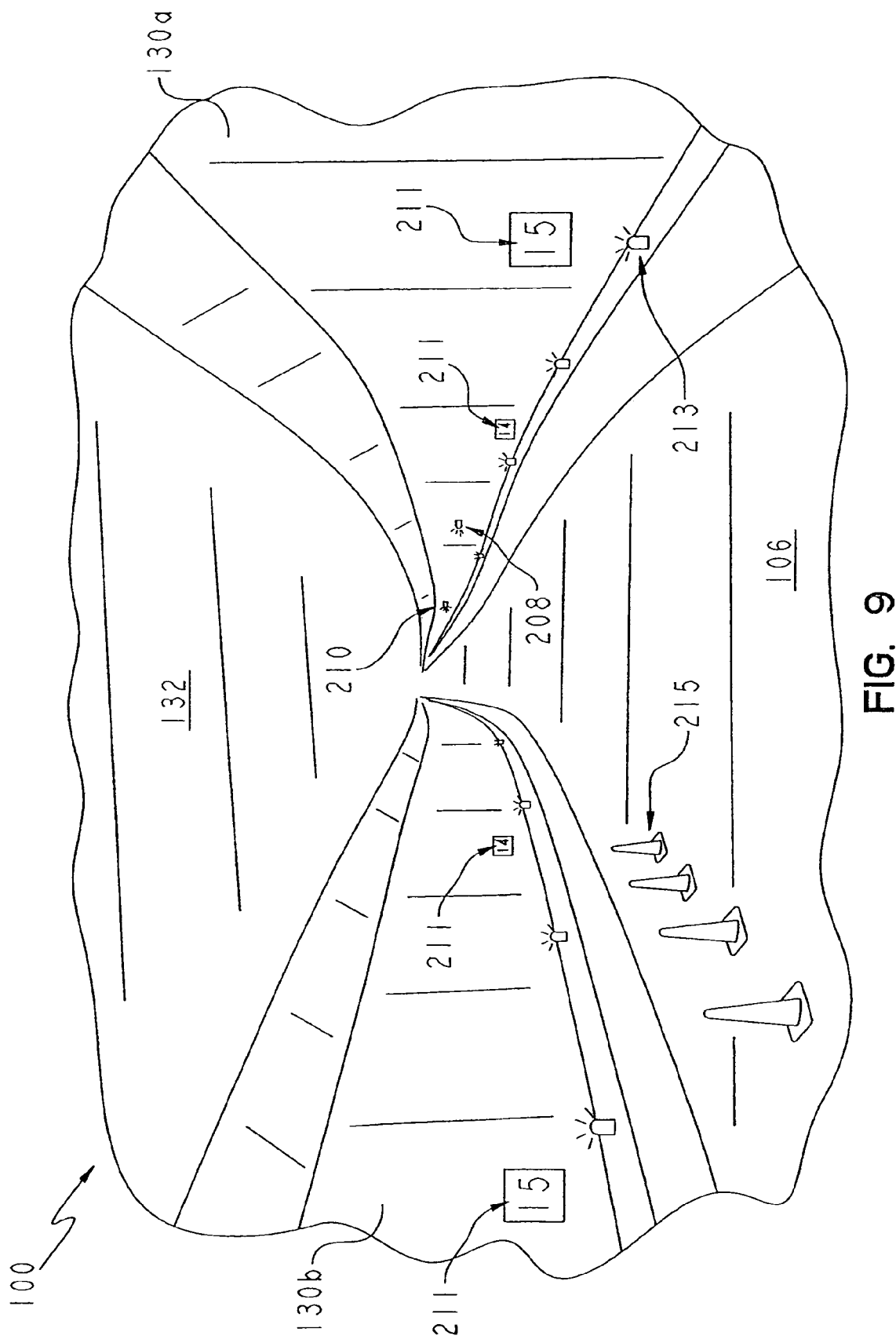
FIG. 9 is an exemplary view of enclosure 100.

Referring to FIG. 9, in one embodiment, enclosure 100 includes location markers 211 which provide an indication to the driver of vehicle 150 of is location in enclosure 100. In one example, location markers 211 provide an indication of the feet remaining to the beginning of test section 162 in hundreds of feet. Also shown in FIG. 9, enclosure 100 may further include lighting 213 to illuminate enclosure 100. Further, enclosure 100 may further include directional markers 215, such as cones or barriers, to provide an indication of the preferred direction of travel for vehicle 150.

Returning to FIG. 4, an exemplary testing method of vehicle 150 is described. Vehicle 150 is introduced into enclosure 100 through entrance 114. Once vehicle 150 is located inside enclosure 100, entrance 114 is closed. Vehicle 150 is moved to section 160 of support 104. If vehicle 150 is not currently running, the engine of vehicle 150 is started and a driver is positioned in vehicle 150. The controller 182 on vehicle 150 is verified to be working properly. To begin the test the driver of vehicle 150 accelerates vehicle 150 to a desired speed, such as 120 mph, prior to entering section 162.

As vehicle 150 passes transmitter 188a, receiver 190 on vehicle 150 receives the signal being emitted by transmitter 188a. Controller 182 recognizes based on the received signal that vehicle 150 is in section 162 of support 104 and begins to store sensor data in memory 184 or at least provides an indication in the sensor data that vehicle 150 has entered section 162. Vehicle 150 exits section 162 when it passes transmitter 188b. When vehicle 150 passes transmitter 188b, receiver 190 on vehicle 150 receives the signal being emitted by transmitter 188b. Controller 182 recognizes based on the received signal that vehicle 150 has exited section 162 of support 104 and ceases to store further sensor data in memory 184 or at least provides an indication in the sensor data that vehicle 150 has left section 162.

The driver of vehicle 150 decelerates vehicle 150 in section 164 to a safe stop. It should be noted that based on the testing being performed the speed of vehicle 150 as it exits section 162 may be higher than, less than, or generally equal to the speed of vehicle 150 when it enters section 162. Vehicle 150 is either driven onto or moved onto a turntable 172 located in section 168 of support 104. Turntable 172 is rotatable in directions 224 and 226 to aid changing the orientation of vehicle 150. It should be noted that turntable 172 is a manually powered turntable. However, a powered turntable may be used. A similar turntable 170 is located in section 160 and is rotatable in directions 228 and 230 to aid in changing the orientation of vehicle 150 in section 166.

Using turntable 172 the orientation of vehicle 150 is changed such that vehicle 150 is facing in direction 214 towards section 162. The sensor data from the first test run is either downloaded or otherwise communicated from memory 184 through output device 192 to a remote device such as controller 202, is deleted, or remains stored in memory 184. If the sensor data from the first test run remains in memory 184, controller 182 is configured to store a separate second set of sensor data in memory 184 without overwriting or otherwise deleting the first set of sensor data.

To begin the second run the driver of vehicle 150 accelerates vehicle 150 to a desired speed, such as 120 mph, prior to entering section 162 from section 164. As vehicle 150 passes transmitter 188b, receiver 190 on vehicle 150 receives the signal being emitted by transmitter 188b or a signal emitted by a transmitter 188c which is aligned with transmitter 188b (if the signal transmitted by transmitter 188b is a line of sight transmission and receiver 190 is positioned on a single side of the vehicle, receiver 190 will not detect the signal from transmitter 188b as vehicle 150 travels in direction 214 hence the need for transmitter 188c). Controller 182 recognizes based on the received signal that vehicle 150 is in section 162 of support 104 and begins to store sensor data in memory 184 or at least provides an indication in the sensor data that vehicle 150 has entered section 162.

Vehicle 150 exits section 162 when it passes transmitter 188a and transmitter 188d which is aligned with transmitter 188a. When vehicle 150 passes transmitter 188a and transmitter 188d, receiver 190 on vehicle 150 receives the signal being emitted by either transmitter 188a or transmitter 188d. Controller 182 recognizes based on the received signal that vehicle 150 has exited section 162 of support 104 and ceases to store further sensor data in memory 184 or at least provides an indication in the sensor data that vehicle 150 has left section 162.

It should be noted that transmitters 188c and 188d are only required if receiver 190 is unable to receive signals from transmitters 188a and 188b as vehicle travels in direction 214 due to the line of sight operation of transmitters 188a, 188b and receiver 190. In one example, transmitters 188a, 188b, and receiver 190 are configured to detect RF energy and do not require line of sight detection.

In a first exemplary testing method, vehicle 150 is configured in a first aerodynamic configuration. A particular configuration of vehicle 150 is known as a vehicle setup. Vehicle 150 is then accelerated to a desired speed, such as about 120 mph to about 130 mph, prior to entering section 162. Once vehicle 150 enters section 162 it is allowed to coast until it exits section 162. The decay in speed of vehicle 150 as it travels through section 162 is attributable to the aerodynamic properties of the setup of vehicle 150.

In one example, vehicle 150 is accelerated by a driver and vehicle 150 is allowed to coast by the driver removing his foot from the accelerator and not applying the brake. The driver uses visual indicator 208, a notification from controller 182 (on a display or speaker not shown), or a combination of the two as an indication that vehicle 150 has entered or is about to enter section 162. Similar indications are used to communicate that vehicle 150 has exited section 162. Vehicle 150 can also be configured to coast by controller 182 automatically disabling the acceleration capability of the vehicle when it is detected that vehicle 150 has entered section 162. In another example, vehicle 150 is accelerated and/or steered by a controller, such as controller 182. Inputs to controller 182 can be provided by a remote input device (not shown). Controller 182 detects when vehicle 150 enters section 162 and automatically permits vehicle 150 to coast.

Various modifications can be made to the vehicle setup of vehicle 150 to effect its aerodynamic properties. For instance, assuming vehicle 150 is a race car, the clearance between vehicle 150 and support 104 may be adjusted or the orientation or configuration of one or more components, such as a spoiler (for instance the length of a wicker bill can be adjusted). Once vehicle 150 has been configured in a second setup, the same testing described above can be repeated. Since the volume of air in enclosure 100 is a generally repeatable static volume of air, any changes observed in the decay of speed of vehicle 150 or other parameters being measured can be attributed directly to the change in vehicle setup as opposed to changes in the volume of air surrounding vehicle 150. Similarly if enclosure 100 provides generally constant temperature conditions or generally constant humidity conditions, the effects of temperature fluctuation or humidity fluctuation can be ignored when evaluating performance characteristics.

In a second exemplary testing method, vehicle 150 is configured in a first aerodynamic configuration. Vehicle 150 is then accelerated to a desired speed, such as about 120 mph to about 130 mph, prior to entering section 162. Once vehicle 150 enters section 162, vehicle 150 is held at a generally constant speed, such as the desired speed. The requirements on vehicle 150, such as the revolutions per minute (rpm) of the engine, to maintain the desired speed are due in part to the aerodynamic characteristics of vehicle 150.

Similar to the first testing method, various modifications can be made to the vehicle setup of vehicle 150 to effect its aerodynamic properties. Once vehicle 150 has been configured in a second setup, the same testing described above can be repeated. Again, since the volume of air in enclosure 100 is a generally repeatable static volume of air, any changes observed in the requirements on vehicle 150 or other parameters being measured can be attributed directly to the change in vehicle setup as opposed to changes in the volume of air surrounding vehicle 150.

Any of the testing methods described herein or additional testing methods can include multiple vehicles 150 to determine how a particular setup of one of vehicles 150 responds in traffic conditions. In one example, at least two vehicles are tested simultaneously under normal operating conditions in either a side-by-side orientation or a front and back orientation. In another example, vehicle 150 tows a dummy vehicle, i.e. a vehicle not currently operating under its own power, during testing. The effect of the setup of the dummy vehicle does not effect the measurements being recorded for various setups of vehicle 150 as long as the setup of the dummy vehicle remain constant. It should be appreciated that the presence of the dummy vehicle will have an effect, but that effect should be a repeatable test condition due to the constant setup of the dummy vehicle.

Similarly, additional components not otherwise used with vehicle 150 during normal operation may be added to vehicle 150 for a variety of reasons including safety. The presence of these additional components may alter the measurements taken during testing of vehicle 150, but should provide a constant effect from one setup of vehicle 150 to another setup of vehicle 150. Therefore, any change in the measurements taken during testing as a result of the presence of the additional components should be constant from one setup to the next setup.

Figure 10:
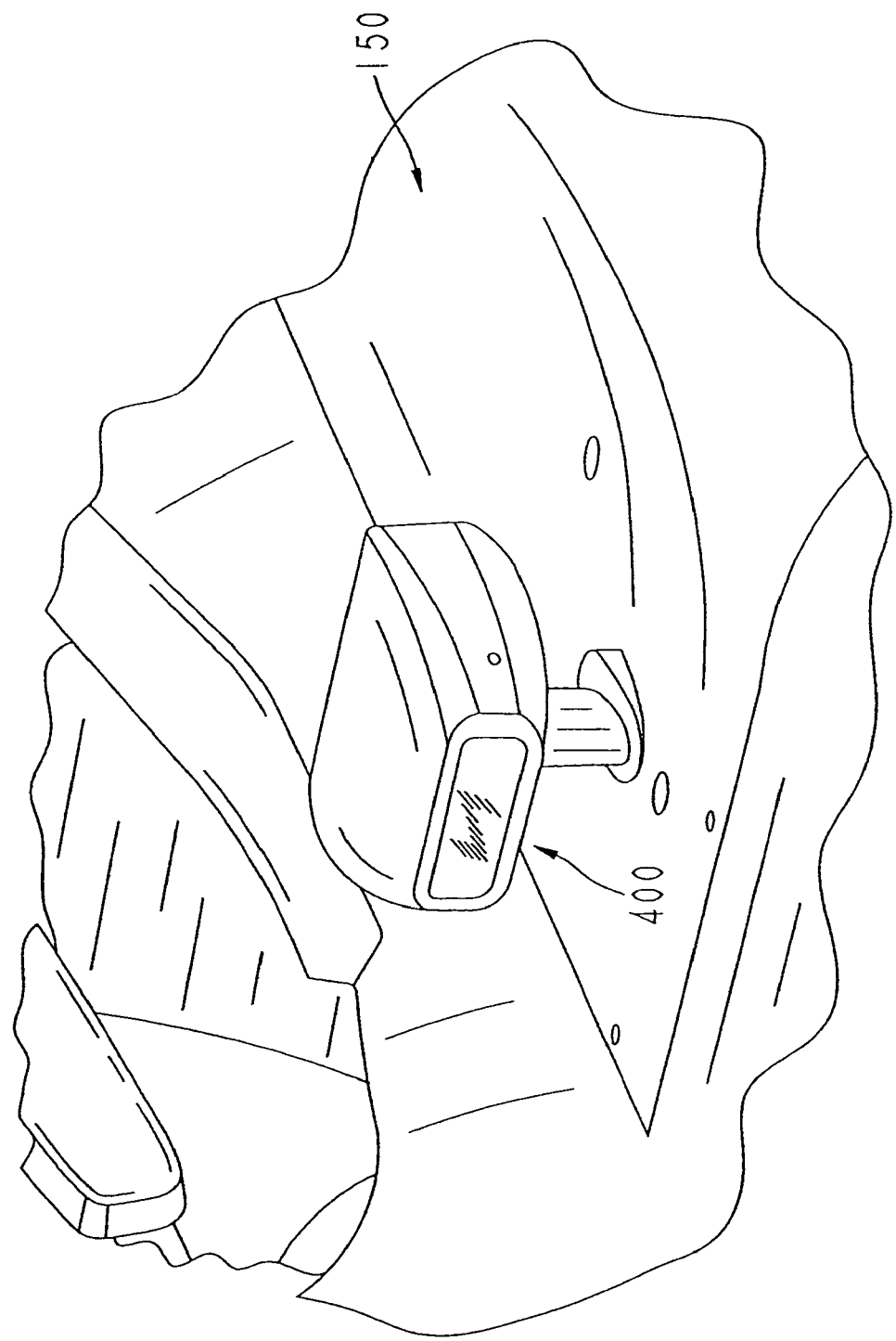
FIG. 10 illustrates an additional component, a light, which is attached to a vehicle.

As shown in FIG. 10, an exemplary additional component is light 400 coupled to vehicle 150. Light 400 is powered by vehicle 150 and provides an extra set of lights in case lighting 213 in enclosure 100 is inadvertently turned off or otherwise loses power.

As stated above, assuming at least a portion of section 162 has a downhill grade, such as a downhill grade of about two percent, the rolling resistance of the wheel bearing (not shown) on vehicle 150 can be measured. Vehicle 150 is rolled up to the entrance to section 162 and allowed to roll into section 162. The mechanical drag of vehicle 150 due to the wheel bearing can be measured independent of the aerodynamic drag due to the setup of the vehicle. Also, since the downhill grade always provides a constant power source and the volume of air in enclosure 100 is a generally repeatable static volume of air, the incorporation of a downhill grade in enclosure 100 provides a repeatable environment for testing mechanical drag.

Although a few exemplary testing setups have been described to briefly demonstrate various ways in which enclosure 100 may be used to gather information for use in the evaluation of a performance characteristic of vehicle 150, enclosure 100 may be used for further testing setups to provide data for the evaluation of other performance characteristics wherein a repeatable testing environment is needed for a vehicle operating under its own power.

Figure 6:
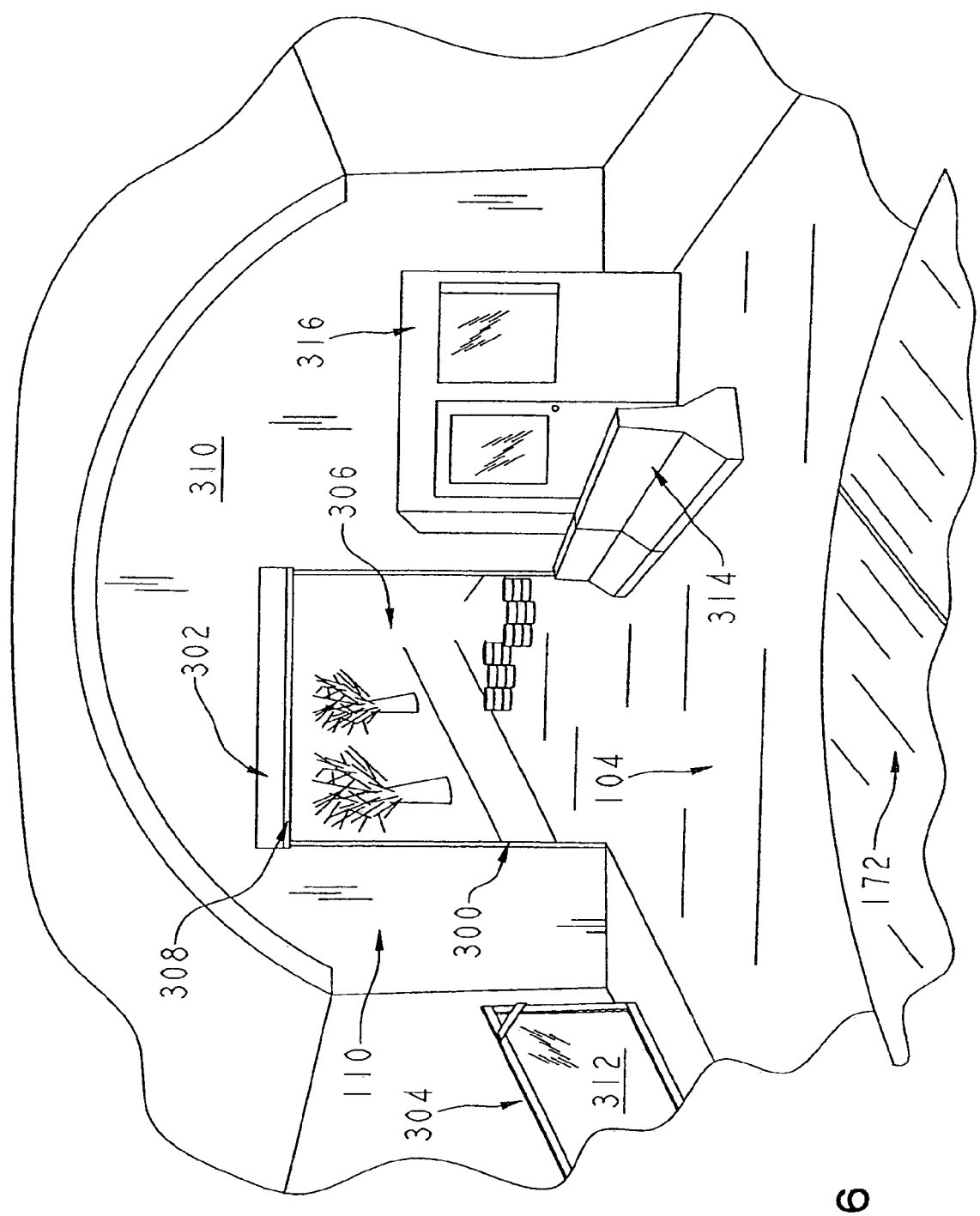
FIG. 6 is an exemplary view of a second end of the enclosure of FIG. 1A illustrating an entrance having an upper portion of a door and a lower portion of the door situated next to a wall of the enclosure.
Figure 7:
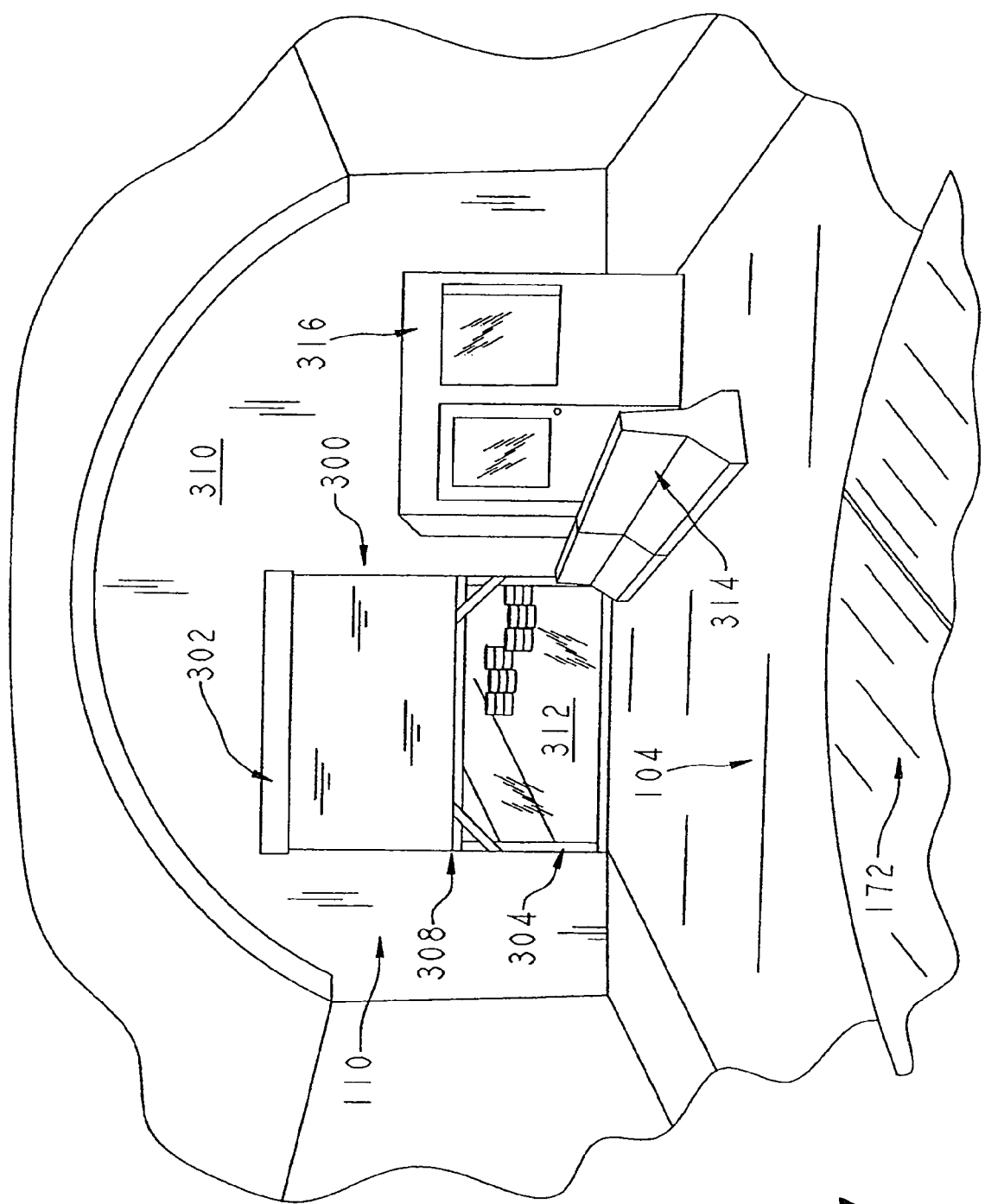
FIG. 7 is an exemplary view of a the send end shown in FIG. 6 with the lower portion of the door positioned in the entrance and the upper portion of the door contacting the lower portion.

Referring to FIGS. 6 and 7, an exemplary entrance 300 is shown. Entrance 300 may be used for entrance 114, 116. Entrance 300 includes an upper section 302, illustratively shown as a roll top door and a lower section 304. Lower section 304 is configured to be received in an opening 306 of entrance 300 and to support a lower portion 308 of the upper section 302. In use, lower section 304 is placed in opening 306 and the door of upper section 302 is lowered until lower portion 308 of the door rests on lower section 304.

Lower section 304 is not fixably coupled to upper section 302 or wall 310 bounding entrance 300. As such, lower section 304 may breakaway from upper section 302 if it is impacted by vehicle 150 thereby permitting vehicle 150 to egress from the enclosure. In one embodiment, lower section 304 includes an at least partially translucent portion 312 which permits light to enter enclosure 100 and/or provides an indication of the location of lower section 304.

Also shown in FIG. 6, a barrier 314 is provided which protects a shelter 316 from oncoming an vehicle 150 and funnels vehicle 150 toward lower section 304. Shelter 316 may be used by personnel for various activities and as a safe place from which to observe testing.

Figure 8:
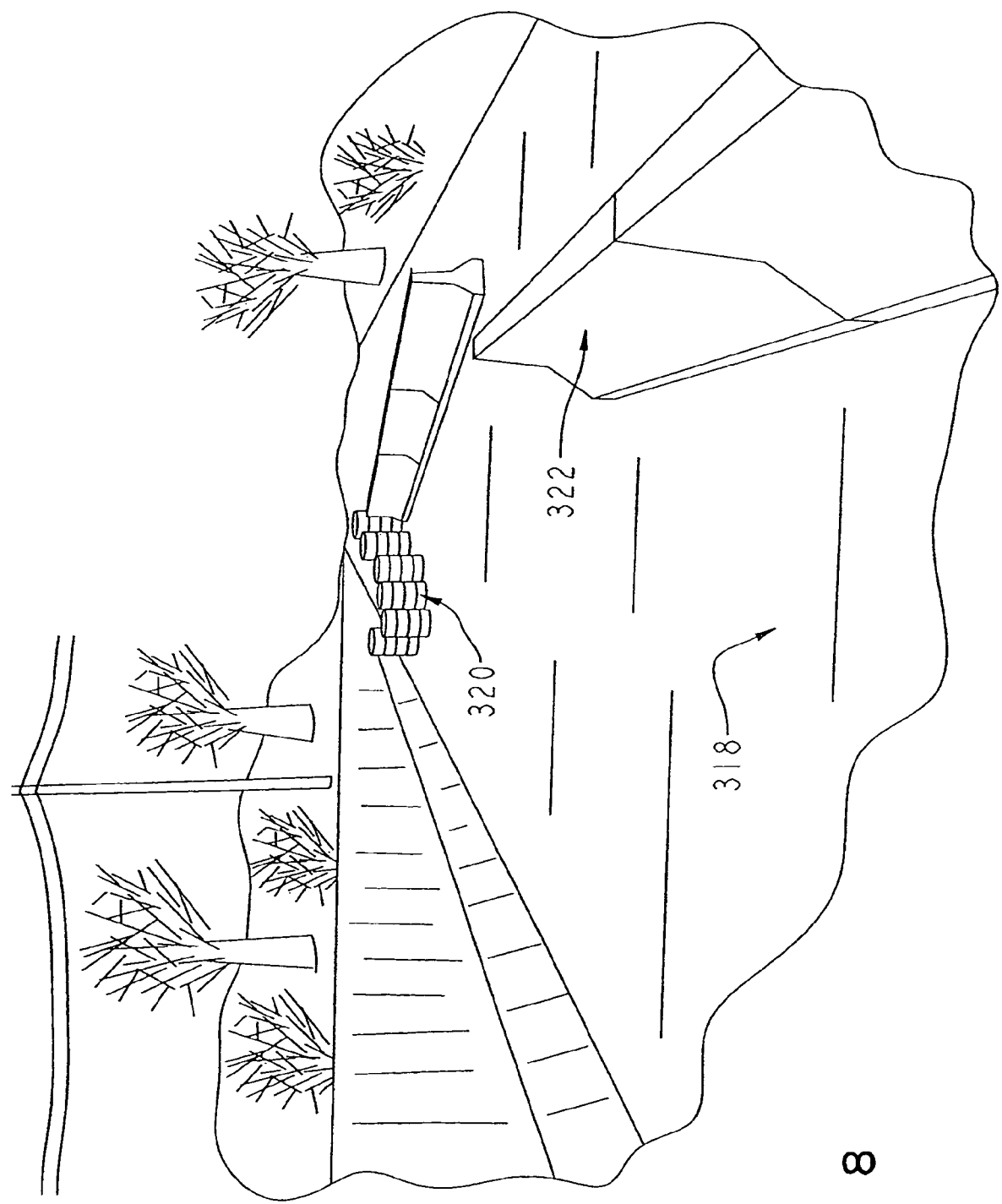
FIG. 8 is an exemplary run out support positioned outside of the second end of FIG. 6 including an impact member and a barrier.

Referring to FIG. 8, a second support 318 is shown. Second support 318 is generally positioned adjacent to second end 110, but may also be positioned adjacent first end 108. Second support 318 provides a support for vehicle 150 if it egresses from enclosure 100, such as by breaking through lower section 304. Second support 318 further includes an impact member 320 which aid in the deceleration of vehicle 150. In one example impact members 320 are vehicle tires, barrels of sand, or a crushable barrier. Second support 318 further supports barriers 322 which limit the direction of travel of vehicle 150 and funnel vehicle 150 towards impact member 320.

Although the present invention has been described in detail with reference to preferred embodiments, variations and modifications exist within the scope and spirit of the present invention as described and defined in the following claims.

The invention claimed is:

1. An apparatus for testing a moving vehicle as it travels across a support surface to evaluate at least one performance characteristic of the moving vehicle, the moving vehicle including at least one sensor, the apparatus comprising:
   an enclosure having a controllable environment;
   the enclosure including a first section for vehicle acceleration to a predetermined speed, a second section for gathering information from the sensor for evaluating at least one performance characteristic of the moving vehicle at the predetermined speed for a predetermined time, and a third section for vehicle deceleration to a stop; and
   a controller for controlling at least one environmental condition of the enclosure to provide for subsequent testing of the moving vehicle at generally repeatable environmental conditions.

2. The apparatus of claim 1, wherein the environmental condition is selected from the group of temperature and humidity.

3. The apparatus of claim 1, further comprising a sensor within the enclosure to monitor the environmental condition and to provide an indication of the environmental condition to the controller.

4. The apparatus of claim 3, further comprising an environment adjustment device configured to adjust the environmental condition, the environment adjustment device being controlled by the controller based on the indication received from the sensor.

5. The apparatus of claim 1, further comprising an alarm to monitor the environmental condition of the enclosure.

6. The apparatus of claim 5, wherein the alarm is a carbon monoxide alarm.

7. The apparatus of claim 1, further comprising at least one turntable coupled to the support and configured to support the vehicle and to change the orientation of the vehicle, the at least one turntable being positioned at a first end of the support.

8. The apparatus of claim 7, wherein the turntable is a powered turntable.

9. The apparatus of claim 7, wherein the turntable is a manual turntable.

10. An apparatus for testing a vehicle moving under its own power to evaluate at least one performance characteristic of the vehicle, the vehicle including at least one sensor, the apparatus comprising:
   an enclosure having a controllable environment;
   the enclosure including a first section for vehicle acceleration to a predetermined speed, a second section for gathering information from the sensor for evaluating at least one performance characteristic of the vehicle at the predetermined speed for a predetermined time, and a third section for vehicle deceleration to a stop; a controller for controlling at least one environmental condition of the enclosure to provide for subsequent testing of the vehicle at generally repeatable environmental conditions;
   a support having an upper surface, the support being configured to support the vehicle and to permit the vehicle to travel across the upper surface of the support;
   an upper portion cooperating with the support to define the enclosure, the upper portion having an entrance, the entrance being positionable in an open position permitting the vehicle to ingress into and egress out of the enclosure and a closed position generally blocking the vehicle from ingress into and egress out of the enclosure;
   a first transmitter coupled to one of the support and the upper portion and located at a first position along a length of the support, the first transmitter configured to provide an indication to the controller of the vehicle that the vehicle has passed the first position, the first position being chosen to provide a sufficient length of the support to permit the acceleration of the vehicle to a predetermined speed prior to reaching the first position; and
   a second transmitter coupled to one of the support and the upper portion and located at a second position along the length of the support spaced apart from the first position, the second transmitter configured provide an indication to the vehicle that the controller of the vehicle has passed the second position, the second position being chosen to provide a sufficient length of support subsequent to the second position to permit the vehicle to decelerate to a stop.

11. The apparatus of claim 10, wherein the upper surface of the support is generally straight along the length of the support.

12. The apparatus of claim 11, wherein the support includes a concrete substrate and an asphalt upper portion, the upper surface being generally smooth.

13. The apparatus of claim 12, wherein the smoothness of the upper surface is about a 40 road number.

14. The apparatus of claim 10, wherein the first transmitter and the second transmitter each emit a signal that is received by a receiver on the vehicle as the vehicle passes by the respective transmitter.

15. The apparatus of claim 10, wherein the upper portion further includes a break away section removably coupled to the upper section and configured to become spaced apart from the remainder of the upper portion when the vehicle impacts the breakaway section, the breakaway section thereby permitting the vehicle to at least partially egress from the enclosure.

16. The apparatus of claim 15, wherein the entrance includes a door and the breakaway section is a first portion of the door.

17. The apparatus of claim 16, wherein at least a portion of the breakaway section is at least partially translucent.

18. The apparatus of claim 15, further comprising a second support positioned outside of the enclosure and adjacent the breakaway section, the second support configured to support the vehicle as it egresses from the enclosure through the breakaway section.

19. The apparatus of claim 18, further comprising an impact member supported by the second support and configured to aid in the deceleration of the vehicle.

20. The apparatus of claim 19, wherein the impact member is a plurality of tires.

21. An apparatus for testing a vehicle moving under its own power to evaluate at least one performance characteristic of the vehicle, the vehicle including at least one sensor, the apparatus comprising:
   an enclosure having a controllable environment;
   the enclosure including a first section for vehicle acceleration to a predetermined speed, a second section for gathering information from the sensor for evaluating at least one performance characteristic of the vehicle at the predetermined speed for a predetermined time, and a third section for vehicle deceleration to a stop; a controller for controlling at least one environmental condition of the enclosure to provide for subsequent testing of the vehicle at generally repeatable environmental conditions;

a first indicator located at a first position within the enclosure and a second indicator located at a second position within the enclosure, the second position being spaced apart from the first position and the portion of the support located generally between the first position and the second position defining a test region of the apparatus, the first indicator being configured to provide a first indication corresponding to the vehicle being at the first position and the second indicator being configured to provide a second indication corresponding to the vehicle being at the second location; and wherein the controller is operably coupled to the sensor and configured to collect information related to the sensor data at least when the vehicle is in the test region, the test region being of a length sufficient to permit the collection of information related to sensor data for a predetermined period of time.

22. The apparatus of claim 21, wherein the predetermined period of time is at least about 5 seconds to about 7 seconds.

* * * * *